United States Patent Office

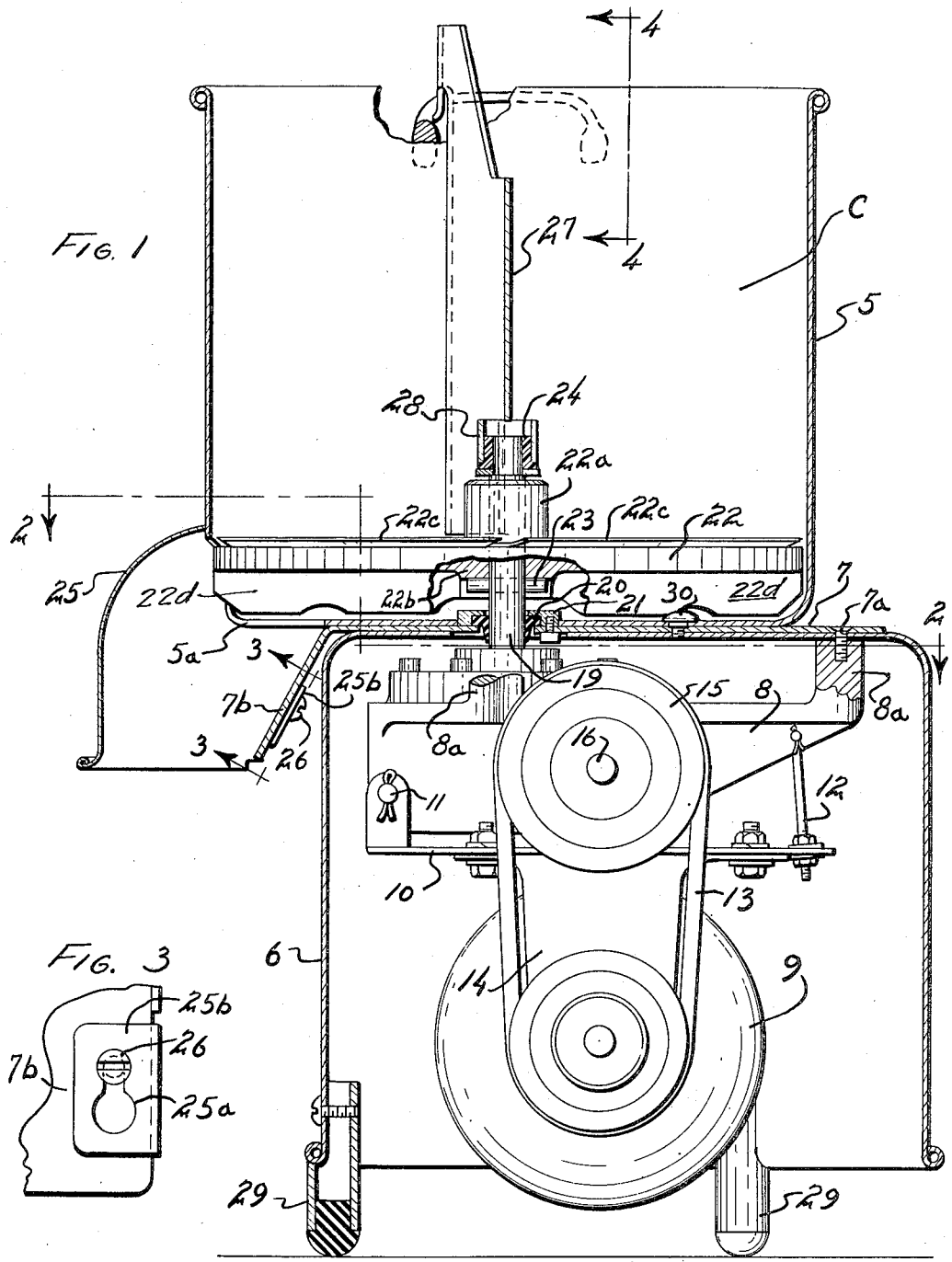

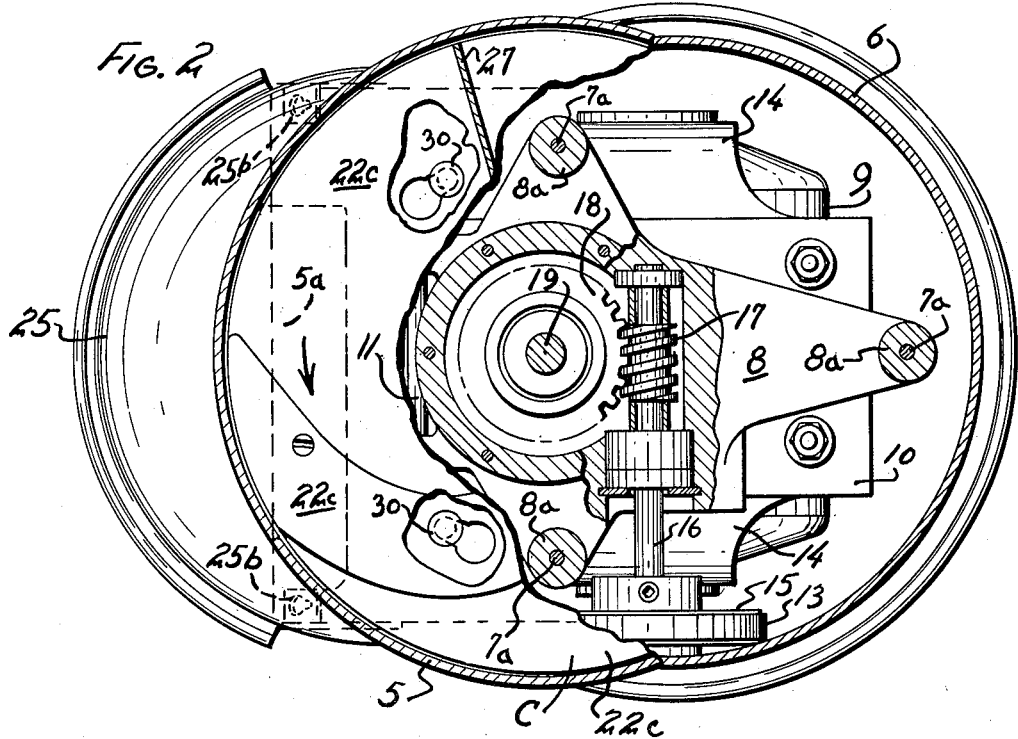
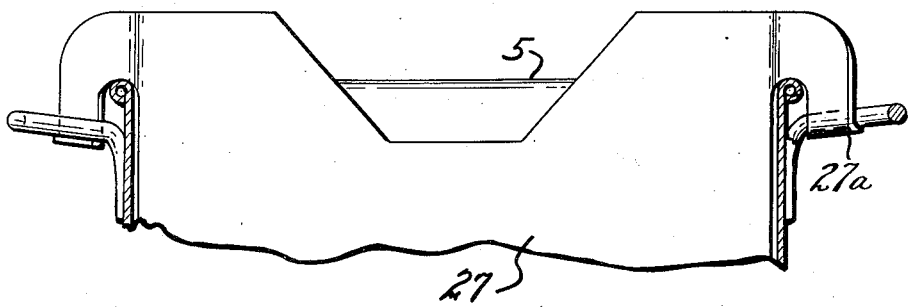

2,805,697
Patented Sept. 10, 1957

2,805,697

DEVICE FOR SLICING VEGETABLES AND THE LIKE

Paul J. Nieland, South St. Paul, Minn., assignor to Hurricutter, Inc., Minneapolis, Minn., a corporation of Minnesota Application November 8, 1954, Serial No. 467,400

6 Claims. (Cl. 146—68)

This invention relates generally to vegetable slicers and more particularly to the combined construction of the slicing chamber and power housing for such a device.

For many years it has been a problem to provide a vegetable slicer particularly adapted for commercial use in restaurants, hotels and wherever large quantities of food must be prepared, which can be inexpensively produced while still providing the desired cutting capacity required for such commercial slicing operations.

It is therefore an object of my present invention to provide a vegetable slicer having an extremely high capacity but being specifically constructed to permit cheap and inexpensive production thereof by using a particular arrangement of parts which are now being presently manufactured in large quantities and which, therefore, can be inexpensively purchased.

It is another object to provide a vegetable slicer wherein a pair of standard inexpensive containers are placed in bottom to bottom relation with the upper container forming the slicing and vegetable confining chamber and the lower container housing the cutter driving mechanism and provided with means for guiding the sliced vegetables through a relatively small discharge opening to permit the same to be delivered into a collection receptacle.

It is still another object to provide a device for slicing vegetables and the like wherein the rotary cutter blade is mounted within a confining and slicing chamber having an open top but a closed bottom and the cutter driving mechanism is mounted within a housing having an open bottom but provided with a closed top disposed in close association with the bottom of said chamber and wherein said rotor and said chamber are bodily removable from the lower housing to permit quick and thorough cleaning of all parts which come into contact with the vegetables during the slicing operation.

More specifically it is an object to provide a construction for vegetable slicers wherein both the upper container forming the slicing and confining chamber and the lower container forming the housing for the cutter driving mechanism are provided by conventional inexpensive cooking kettles which are produced in large quantities and are made of stainless steel which is, of course, very acceptable for handling commercial food products in view of its noncorrosive and extremely durable properties; the upper container being in the form shown of the same size as the lower container and being removably mounted thereon in bottom to bottom relation with the upper container being radially offset from the lower container and having a discharge opening formed in the offset portion to permit the sliced vegetables to be delivered therethrough.

These and other objects and advantages of my invention will more fully appear from the following description made in connection with the accompanying drawings wherein like reference characters refer to the same or similar parts throughout the several views, and in which:

Fig. 1 is a central vertical sectional view showing my new vegetable slicer;

Fig. 2 is a horizontal sectional view taken substantially along the broken line 2—2 of Fig. 1;

Fig. 3 is a fragmentary sectional view taken substantially along the line 3—3 of Fig. 1; and Fig. 4 is a fragmentary vertical sectional view taken substantially along the line 4—4 of Fig. 1 and showing in detail the upper portion of the divider partition in operative position.

As illustrated in the accompanying drawings I provide a pair of containers made from any durable non-corrosive material such as stainless steel or the like and of a type produced in large quantities such as the stainless steel cooking kettles or containers respectively designated by the numerals 5 and 6. The lower container 6 is inverted and positioned in bottom to bottom relation with the upper container 5 as best shown in Fig. 1. The upper container defines a slicing and confining chamber C therewithin and has a portion of the periphery thereof extending outwardly beyond the periphery of the lower container. In the form shown the containers 5 and 6 are of the same size and the upper container is radially offset with respect to the lower container.

In order to provide the necesary rigidity and reinforcement for mounting the cutter driving mechanism within the confines of the lower container 6, a reinforcing and mounting plate 7 is interposed between the two bottoms of the containers 5 and 6 and in the form shown is securely fixed to the bottom container 6 as by the screws 7a. A gear box casing 8 is suspended from the reinforced bottom of container 6 as by the upstanding mounting feet 8a which are tapped to receive screws 7a as best shown in Fig. 1. The gear box casing 8 also provides the support for suspending the driving motor 9 from said reinforced bottom of inverted container 6 and a pivotally mounted motor mounting bracket 10 is swingably supported at one end from the horizontal pins 11 carried by the lower portion of said casing 8 and the other end thereof is adjustably supported by a tie rod 12 so that the tension in the driving belt 13 may be varied. The motor 9 is provided with suitable end mounting brackets 14 which are rigidly supported from the mounting bracket 10.

The belt 13 is trained about a driven pulley 15 as best shown in Figs. 1 and 2 and said pulley 15 drives a shaft 16 journaled in said casing 8. The shaft 16 has a driving worm 17 keyed thereto and said worm meshes with a pinion 18 which is keyed to the lower end of the cutter shaft 19. The shaft 19 extends upwardly through the top of gear casing 8 and passes through aligned apertures formed in the bottoms of the two containers 5 and 6 and through the mounting plate 7 as best shown in Fig. 1. In view of fact that all vegetables contain considerable liquid, it has been found necessary to provide suitable sealing means around the shaft where it passes through said laminated plates. The rubber seal 20 tightly surrounds shaft 19 and is firmly held in place by an annular seal-clamping and retaining member 21 which is securely fixed to reinforcing mounting plate 7 by any suitable means.

The shaft 19 extends upwardly a substantial distance above the bottom of upper container 5 and has a rotary cutter 22 mounted thereon with a suitable driving connection therewith such as the cross pin 23 which extends through a suitable aperture formed through shaft 19 as best shown in Fig. 1. The cutter has a central hub or boss 22a extending upwardly therefrom and another boss 22b extending downwardly from the main platform thereof. The lower boss 22b has a pair of aligned pin receiving slots formed therein to receive the pin 23 and form the driving connection between the cutter rotor 22 and shaft 19 but permitting easy removal of said rotor by merely lifting the same from said shaft and from the container C. The upper portion of the shaft 19 is diminished to provide an abutment shoulder and a self-lubricating type of bushing such as the nylon bushing 24 is journaled on said diminished portion for purposes to be subsequently discussed. The cutter 22 is of generally similar design to the cutter disclosed and claimed in United States Patent No. 2,590,909, issued on April 1, 1954, to Walter P. Westby and Maynard P. Hanson, but has a pair of generally spirally curved upwardly sloping cutter blades 22c extending above the similarly shaped slots and said cutter is provided with a pair of sweep arms 22d having a shape similar to said slots and respectively depending below the leading edge of said slots to carry the cut vegetables outwardly to the periphery of the chamber C below the cutter platform to discharge the same through a discharge opening 5a provided in the bottom and lower side wall formed in the offset over-hanging portion of the upper container 5.

One end portion of the reinforcing mounting plate 7 extends outwardly under the offset portion of upper container 5 and this outwardly extending portion is bent downwardly in inclined relation to deflect the cut vegetables out away from the adjacent side wall portion of the lower inverted container 6 as best shown in Fig. 1. The inner edge of the discharge opening 5a is straight and overlies the bend of reinforcing plate 7 which forms deflector apron 7b.

It is obvious from Fig. 1 that the discharge opening 5a extends upwardly into the lower side wall of the container a distance substantially equal to the elevation of the top of the cutter rotor 22, and the sweep arms 22d will then discharge the cut vegetables radially outwardly with a substantial force. It becomes obvious that a confining hood 25 must be provided to deliver the discharged cut vegetables downwardly into a suitable open top receptacle provided for this purpose. This confining hood is also removably mounted on the deflector apron 7b in any suitable manner such as by the retaining buttons 26 fixed at each side of said apron in underlying relation thereto and adapted to be respectively received through the keyhole type lots 25a formed through the retaining ears 25b fixed to the end portions of said hood 25 and extending inwardly therefrom as by being integrally formed from the material of said hood.

A fixed divider or abutment partition 27 is mounted within the upper container 5 and extends across the vegetable confining and slicing chamber C with the lower edge thereof disposed in slightly spaced relation above the upper edges of the blades 22c. A bushing receiving sleeve 28 is fixed to said divider partition 27 by any suitable means such as by being welded thereto and receives in close fitting relation said bushing 24 to permit positive positioning of the lower portion of said divider partition and prevent shifting movement thereof. Suitable partition hold down means are provided such as the clips 27a on the upper ends of the partition which can be removably anchored to the gripping handles of the upper container C as best shown in Fig. 4. Suitable means for supporting the bottom container 6 may be provided such as the depending feet 29 fixed in peripherally spaced relation around the lower portion thereof.

It is obvious from the foregoing description that the partition 27 may be easily and quickly removed from the compartment C and the rotary cutter 22 also removed therefrom. It should be noted that the partition and the top interlocking means provided therefor positively prevent the cutter from being pushed up out of driving contact with the pin 23 when in operative position. The bottom of the container 5 is interlocked with the plate 7 by the buttons 30 mounted in said plate and which extend through suitable keyhole slots provided in said bottom and securely interlock the container 5 and the plate 7 but which permit easy removal of the container 5 from the plate 7 to facilitate cleaning.

The following is a description of the operation of my improved vegetable slicer. The vegetables to be sliced are, of course, initially inserted into the upper container 5. The partition 27 divides the chamber C into two compartments and provides an abutment for the vegetables being sliced which causes said vegetables to be held while the bottom thereof is cut off with a pre-determined thickness of slice which is discharged downwardly through the slot. The spiral shape of the blades, of course, produces an efficient cutting action and the sweep arms 22d will engage the slices passing downwardly through said slots and carry the same outwardly to the periphery of the container 5 in the space provided below the cutter platform. When said arms carry the slices around to the discharge opening 5a the same are delivered therethrough and collected in a suitable receptacle positioned under the opening defined by the confining hood 25 and the deflector apron 7b. In the form shown the opening 5a does not extend the full length of a chord of the generally circular upper container 6. As best shown in Fig. 2 the initial end of said opening terminates a slight distance from the outer periphery of said container in order to reduce the speed of discharge of the slices through said opening.

In order to clean the unit after use the partition 27 may be lifted out of container 5 with the sleeve 28 and bushing 24 being removed from the upper end of rotor drive shaft 19 to permit removal of the rotor 22. All parts including the container 5 may then, of course, be washed separately to insure thorough cleaning thereof. Obviously the hood 25 may also be removed to facilitate cleaning thereof and also permit ready access to the deflector apron 7b. When the upper container 5 is removed, the top of mounting plate 7 is readily accessible for cleaning.

It will be seen that I have provided a highly efficient vegetable slicer which is specifically designed to permit inexpensive manufacture while maintaining highly efficient operation thereof. The rotor is driven at between 200 and 300 R. P. M. and the power driving mechanism for the rotor is suspended from the reinforced bottom of the inverted lower container 6 and may be easily and quickly removed for convenient servicing if necessary, by merely removing the three screws 7a to release the gear casing 8 which also carries the motor 9 as has been previously described. The peripheral offset portion of the upper container with respect to the lower container in combination with the rotor and the confining hood provides a cutter which will deliver into a standard type receptacle such as a cooking vessel or the like and entirely eliminates the necessity for a special collecting receptacle such as that required in the previously herein identified Westby and Hanson patent. In other words, the use of two standard cooking kettles disposed in bottom to bottom relation with the upper kettle having a peripheral offset portion with relation to the lower kettle permits a materially less expensive cutter to be produced than that disclosed in the said Westby and Hanson patent, since the structure disclosed therein requires special tooling and sheet metal work and is substantially harder to service and maintain than is the unit disclosed in said patent. The cost of manufacturing has been reduced to approximately one quarter of that required for the construction of the device shown in said patent. The reinforcing plate with the deflector apron integrally formed therewith provides the necessary strength for mounting and supporting the driving mechanism from the bottom panel of the lower inverted container.

It will, of course, be understood that various changes may be made in the form, details, arrangement, and proportions of the parts without departing from the scope of

What is claimed is:

1. A vegetable slicer comprising a container having sides and a substantially uniplanar bottom, a power driven rotary cutter element in said container adjacent the bottom thereof, said cutter element having at least one cutter on the upper portion thereof and at least one opening adjacent said cutter for delivering cut material therethrough, a material discharging means formed on the lower portion of said cutter element, said container being provided with a material discharging opening through a portion of a side and a portion of the bottom thereof, whereby material cut by said cutter will be discharged laterally and downwardly from said container.

2. The structure set forth in claim 1 and the top of said opening being positioned at substantially the same level as the top of said discharging means.

3. A vegetable slicer comprising a container having sides and a substantially uniplanar bottom, a power driven rotary cutter element in said container adjacent the bottom thereof, said cutter element having at least one cutter on the upper portion thereof and at least one opening adjacent said cutter for delivering cut material therethrough, a material discharging means on the lower portion of said cutter element, said container being provided with a material discharging opening through a portion of a side and a portion of the bottom thereof, a guiding apron extending downwardly and laterally outwardly from the inner edge of the portion of the opening in said bottom, and a confining hood extending laterally outwardly from the upper portion of the opening through the side of said container and downwardly at least as far as the container bottom to confine the material discharged laterally and downwardly through said opening.

4. A vegetable slicer comprising a pair of separate individual containers each having a closed end and an open end, said containers being positioned in generally end-to-end relation one on top of the other with the closed ends thereof disposed in close association when in operative position, a reinforcing plate interposed between the closed ends of the containers and having an apron portion extending laterally outwardly and downwardly beyond the closed end of the lower container, power driving means anchored solely to the reinforcing plate and the closed end of the lower container to be supported solely thereby, said upper container being laterally offset from the lower container with a discharge opening being formed through the offset portion of the bottom of the upper container and through the side thereof, a rotary cutter element having at least one cutter on the upper portion thereof and at least one opening adjacent said cutter for delivering cut material therethrough, a material discharging means formed on the lower portion of said cutter element, whereby material cut by said cutter will be discharged laterally and downwardly from said container and over said apron.

5. The structure set forth in claim 4 and a removable hood member extending laterally outwardly from a point disposed above said opening and downwardly at least as far as the bottom of the upper container and removably mounted on said apron.

6. The structure set forth in claim 4 and said upper container being readily removable from said reinforcing plate to facilitate cleaning thereof.

References Cited in the file of this patent

UNITED STATES PATENTS

| | | |
|---|---|---|
| 2,504,900 | Stollsteimer | Apr. 18, 1950 |
| 2,590,909 | Westby et al. | Apr. 1, 1952 |

FOREIGN PATENTS

| | | |
|---|---|---|
| 667,379 | France | June 10, 1929 |